US 8,437,012 B2

(12) United States Patent
Hiraoka

(10) Patent No.: US 8,437,012 B2
(45) Date of Patent: May 7, 2013

(54) IMAGE FORMING APPARATUS AND IMAGE FORMING METHOD

(75) Inventor: Toru Hiraoka, Willich (DE)

(73) Assignee: Murata Machinery, Ltd., Kyoto (JP)

( * ) Notice: Subject to any disclaimer, the term of this patent is extended or adjusted under 35 U.S.C. 154(b) by 740 days.

(21) Appl. No.: 12/615,319

(22) Filed: Nov. 10, 2009

(65) Prior Publication Data

US 2010/0128326 A1   May 27, 2010

(30) Foreign Application Priority Data

Nov. 21, 2008   (JP) ................................ 2008-297450

(51) Int. Cl.
*G06F 3/12* (2006.01)
*G06F 17/00* (2006.01)
*G03G 21/02* (2006.01)

(52) U.S. Cl.
USPC ............ 358/1.1; 358/296; 358/474; 705/400; 705/408; 399/79; 399/80; 399/81

(58) Field of Classification Search ............... 358/1.15, 358/296, 401, 501, 474, 505, 1.1; 399/79, 399/80, 81; 705/400, 408
See application file for complete search history.

(56) References Cited

U.S. PATENT DOCUMENTS

| 6,921,220 | B2 * | 7/2005 | Aiyama | 400/76 |
| 6,945,715 | B2 * | 9/2005 | Nakatani et al. | 400/61 |
| 7,672,603 | B2 * | 3/2010 | Yamamoto et al. | 399/49 |
| 7,880,908 | B2 * | 2/2011 | Suzuki | 358/1.14 |
| 8,073,354 | B2 * | 12/2011 | Yamada | 399/79 |
| 2003/0016384 | A1 | 1/2003 | Hiraoka | |
| 2005/0108032 | A1 * | 5/2005 | Josephsen et al. | 705/1 |
| 2005/0154642 | A1 * | 7/2005 | Wiechers | 705/21 |
| 2006/0263104 | A1 * | 11/2006 | Karn | 399/23 |
| 2011/0038000 | A1 * | 2/2011 | Matsumoto et al. | 358/1.15 |

FOREIGN PATENT DOCUMENTS

| JP | 11-084963 A | 3/1999 |
| JP | 2000-032199 A | 1/2000 |
| JP | 2002-258695 A | 9/2002 |
| JP | 2002-354163 A | 12/2002 |
| JP | 2004-074530 A | 3/2004 |
| JP | 2005321672 A * | 11/2005 |
| JP | 2006-010969 A | 1/2006 |
| JP | 2007-079484 A | 3/2007 |

OTHER PUBLICATIONS

Official Communication issued in corresponding Japanese Patent Application No. 2008-297450, mailed on Dec. 18, 2012.

* cited by examiner

*Primary Examiner* — Cheukfan Lee
(74) *Attorney, Agent, or Firm* — Keating & Bennett, LLP

(57) ABSTRACT

When a maintenance agreement has been made based on a contract printing rate and the contract number of printed sheets, an image forming apparatus can determine before an image is actually formed, whether or not terms and conditions will be exceeded. When a user instructs to copy, after all images of original documents are scanned, it can be determined whether or not the number of remaining printable sheets exceeds a certain number, e.g., 100. When the number of remaining printable sheets is not more than 100, after calculating an average per/page printing rate of the scanned image data, the converted number of sheets, which is converted using the contract printing rate, is calculated from the average printing rate, the contract printing rate, and the number of printed sheets for one copy job, and a screen used in inquiring whether or not to print is displayed.

6 Claims, 5 Drawing Sheets

```
NUMBER OF REMAINING PRINTABLE SHEETS IS 50

WHEN ORIGINAL DOCUMENT IS PRINTED BY INPUT
NUMBER OF COPIES, 40 SHEETS CONVERTED WITH
PRINTING RATE OF 20% WILL BE PRINTED.
CONTINUE COPYING?

NUMBER OF REMAINING PRINTABLE SHEETS IS 50

WHEN ORIGINAL DOCUMENT IS PRINTED BY INPUT
NUMBER OF COPIES, 40 SHEETS CONVERTED WITH
PRINTING RATE OF 20% WILL BE PRINTED.
CONTINUE COPYING?

| OK | NO |

IMAGE FORMING APPARATUS AND IMAGE FORMING METHOD

CROSS-REFERENCE TO RELATED APPLICATION

This application claims priority under 35 U.S.C. 119 to Japanese Patent Application No. 2008-297450, filed on Nov. 21, 2008, which application is hereby incorporated by reference in its entirety.

BACKGROUND OF THE INVENTION

1. Field of the Invention

The present invention relates to an image forming apparatus such as a digital Multi Functional Peripheral (MFP) that scans an original document for conversion into image data and records the image data on a sheet of paper, and to an image forming method.

2. Description of the Related Art

In an image forming apparatus, such as, a recent digital MFP including a copying function, a facsimile function, a printing function, and a scanner function, etc. or a copier, when making a copy, image data of a scanned original document is supplied to a printer and recorded on a sheet of paper.

When signing up a maintenance agreement for such an image forming apparatus, an agreement is made, for example, as follows: "A basic charge paid up front provides maintenances/services including supplies of consumables such as toner up to 2400 sheets per month with a printing rate of 20%." Under such a maintenance agreement, when an actual result of usage is 2000 sheets per month with an average printing rate of 20%, the user could have printed 400 more sheets, which means a loss to the user.

On the other hand, when an actual result of usage is 3000 sheets with an average printing rate of 20%, the user has to pay an additional fee for the extra 600 sheets since the number of prints exceeds a range of the agreement. When an actual result of usage is 2400 sheets with an average printing rate of 30%, if the printing rate (black letter/character rate) is neither calculated nor managed as the result of usage, an additional fee does not occur, which means a loss to the seller. In other words, 2400 sheets with an average printing rate of 30% is equivalent to 3600 sheets with a printing rate of 20%, which means that consumables for the extra 1200 sheets are provided within the range of the basic charge.

As described above, when an actual average printing rate is higher than the supposed printing rate, unless an additional fee is paid, toner that exceeds an amount of toner included in the basic charge is used for the basic charge, which means a loss to the seller. In contrast, when the actual average printing rate is lower than the supposed printing rate, all of the toner included in the basic charge cannot be used up, which means a loss to the user. In order to eliminate such disadvantages, the maintenance agreement should be made based on a contract printing rate and the contract number of printed sheets.

In order to recognize the time required to replace a toner cassette, a conventional method proposes to calculate a black rate at the time of image forming, i.e., calculate the proportion of the number of black pixels to the total number of pixels per page, and to display the number of remaining recordable sheets that will be recorded when the image forming is continued with the present black rate. The number of remaining recordable sheets is calculated based on an average black rate in the case where a standard image is formed, the average number of image-formed sheets, an average black rate of all of the images that have been formed since the cassette replacement up to the present time, and the number of sheets on which the images have been formed up to the present time.

In order to set and collect an appropriate usage fee for each recording function such as a printer function and a copying function or the like, another conventional art suggests to calculate an accumulated usage fee for each function. That is, it is suggested to store a usage fee per sheet of recording paper, which is set for each function, and to calculate and store the accumulated usage fee for each function based on the number of used sheets for each function and the usage fee per sheet.

In order to keep a usage fee of an image forming apparatus within the budget, another conventional art suggests to add a printing rate each time a printing operation is performed, and to notify the user when a value of a printing rate adding counter reaches an upper-limit counter value, which is set in advance, or when the counter value is likely to exceed the upper-limit counter value.

When making a maintenance agreement based on a contract printing rate and the contract number of printed sheets, the number of remaining recordable/printable sheets may be displayed by applying the calculation for the number of remaining recordable/printable sheets to the maintenance agreement. However, when the number of remaining recordable/printable sheets decreases it cannot be determined whether or not such copying operation exceeds the number of remaining recordable/printable sheets unless a copying operation is actually performed. In other words, since a printing rate of an original document to be copied is not known the number of recordable/printable sheets may become negative when the number of original documents is less than the number of remaining recordable/printable sheets and such original documents are copied.

For example, in the case where the number of recordable/printable sheets with a contract printing rate of 20% is 30, when the number of original documents to be copied is 20 with a printing rate of 40%, such number of original documents is equivalent to 40 with the contract printing rate. As a result, the number of recordable/printable sheets will be minus 10.

SUMMARY OF THE INVENTION

In order to overcome the problems described above, preferred embodiments of the present invention provide an image forming apparatus that can determine, before actually forming an image, whether or not a proposed image forming exceeds terms and conditions in the case where a maintenance agreement has been made based on a contract printing rate and the contract number of printed sheets.

According to a preferred embodiment of the present invention, an image forming apparatus preferably includes an image scanning unit arranged to scan an original and generate image data, an image forming unit arranged to form an image on a recording medium based on the image data, and a control unit arranged to control each of the image scanning unit and the image forming unit. In such an image forming apparatus, when executing a copying operation, after original documents are scanned by the image scanning unit, the control unit calculates the converted number of sheets, which is converted with a contract printing rate, from a printing rate of the acquired image data, a contract printing rate of a maintenance agreement, and the number of sheets to be printed in the copying operation, and notifies a user of the calculated converted number of sheets. Then the image forming unit forms an image based on the image data when instructed by the user to print.

According to another preferred embodiment of the present invention, in the image forming apparatus, each time the image forming unit forms an image the control unit calculates the number of remaining printable sheets from the contract number of printed sheets and the contract printing rate of the maintenance agreement, an average printing rate up to that time, and the number of sheets that have been printed up to that time, and when the number of remaining printable sheets is not more than the predetermined number of sheets when executing a copying operation, the control unit notifies a user of the converted number of sheets.

According to yet another preferred embodiment of the present invention, in the image forming apparatus, the control unit displays the number of remaining printable sheets along with the converted number of sheets.

In a method of image forming according to a preferred embodiment of the present invention, when executing a copying operation an original document is scanned to acquire image data, the converted number of sheets, which is converted with a contract printing rate, is calculated from a printing rate of the image data, a contract printing rate of a maintenance agreement, and the number of sheets to be printed in the copying operation. Then the user is notified of the calculated converted number of sheets. Further, when the user instructs to print, images are formed based on the image data.

In the image forming apparatus and the method of image forming according to various preferred embodiments of the present invention, when executing a copying operation, the converted number of sheets, which is converted with the contract printing rate, is calculated from the printing rate of the image data acquired by scanning the original document, the contract printing rate of the maintenance agreement, and the number of sheets to be printed in the copying operation, and the user is notified of the calculated converted number of sheets. Accordingly, it can be confirmed whether or not the contract number of printed sheets of the maintenance agreement will be exceeded if the original documents are actually copied when the number of remaining printable sheets decreases. Therefore, printing of an excess number of printed sheets over the contract number of printed sheets of the maintenance agreement can be easily prevented.

According to yet another preferred embodiment of the present invention, when the number of remaining printable sheets is not more than the predetermined number of sheets, the converted number of sheets is displayed. Therefore, the converted number of sheets can be prevented from being notified in vain when the number of remaining printable sheets is sufficient, which thereby can execute the copying operation smoothly.

According to yet another preferred embodiment of the present invention, the number of remaining printable sheets is displayed along with the converted number of sheets. Therefore, it can be easily confirmed whether or not the contract number of printed sheets of the maintenance agreement will be exceeded, and the excess over the contract number of the maintenance agreement can be reliably prevented.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 5 is an example of an inquiry screen for determining whether or not to perform a printing operation.

DETAILED DESCRIPTION OF PREFERRED EMBODIMENTS

Preferred embodiments of the present invention in which an image forming apparatus is applied to a digital MFP will now be described. In the present preferred embodiment, the following are contracted (specified) in a maintenance agreement for the digital MFP: a predetermined contract printing rate and the contract number of printed sheets for which consumables are supplied within a basic charge at no extra charge, in one counting period, such as one month or three month(s), for example. More specifically, the contract number of printed sheets, which is converted into A4-size paper, in one counting period is contracted. For example, a contract printing rate of 20% and the contract number of 2400 printed sheets, which is converted into A4-size paper, in one counting period are registered in the digital MFP, for example.

When the number of remaining printable sheets is not more than the predetermined number of sheets in such a counting period, a screen used for inquiring as to whether or not to perform printing is displayed in subsequent copying operations. The actual counted number of printed sheets (actual number of printed sheets) is reset after the elapse of the counting period.

Figure 1:
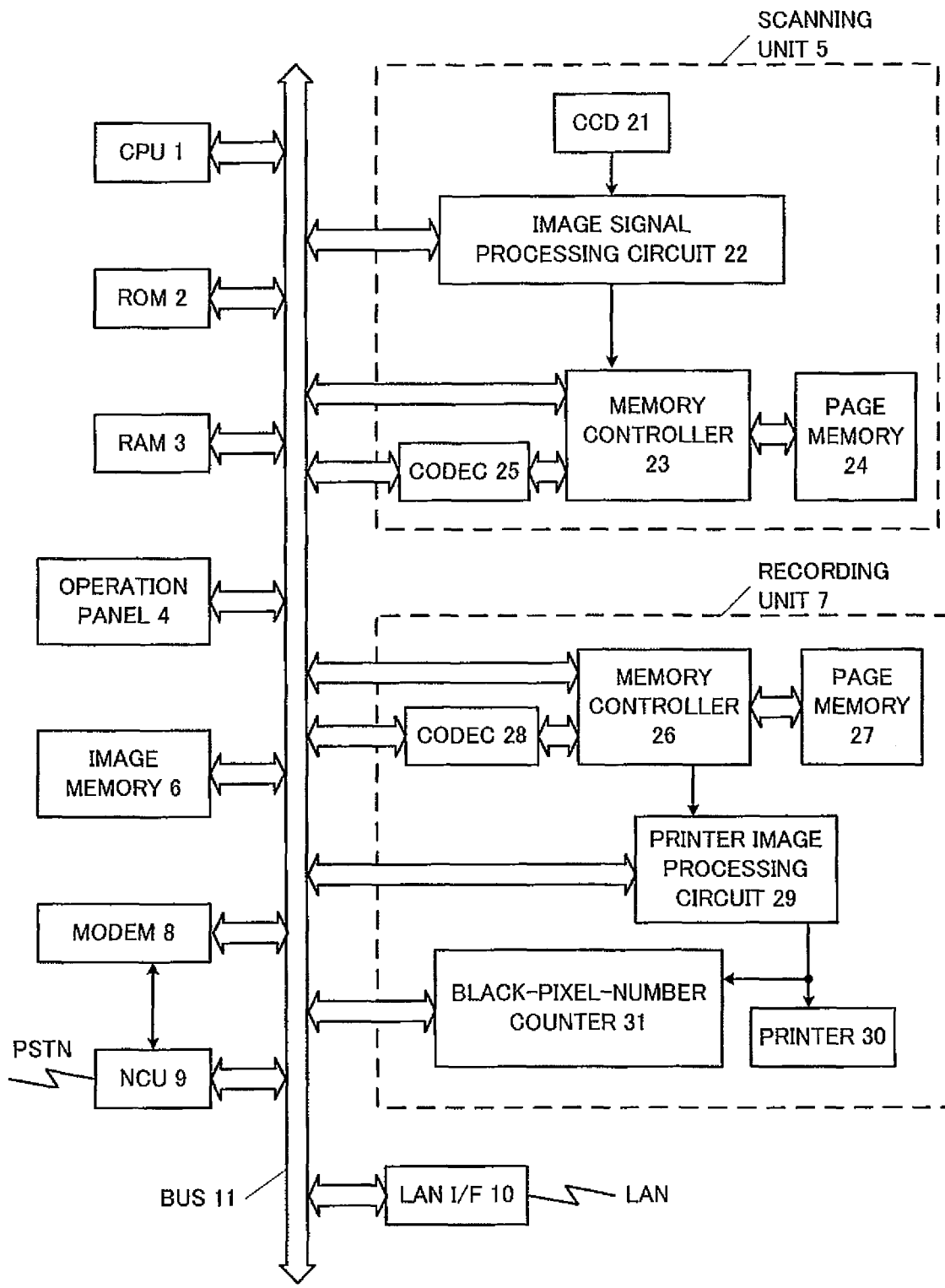
FIG. 1 is a block diagram of a hardware configuration of a digital MFP.

FIG. 1 is a block diagram of a preferred hardware configuration of the digital MFP. A CPU 1 controls each hardware unit of the digital MFP via a bus 11, and executes various programs based on programs preferably stored in a Read Only Memory (ROM) 2. The ROM 2 prestores the various programs and operation messages that are necessary to operate the digital MFP. A Random Access Memory (RAM) 3 stores temporal data that occurs at the time of program execution, a set counting period, contract printing rate, and the contract number of printed sheets of the maintenance agreement. The RAM 3 also stores: an average per-page printing rate of pages that have been actually printed in one counting period, which average printing rate is converted on the basis of A4-size paper; the actual number of printed sheets defined as a result of usage; and the number of remaining printable sheets which is converted into A4-size paper with the contract printing rate.

An operation panel 4 preferably includes a display unit arranged to display an operational state of the digital MFP and an operation screen arranged to perform various functions, and a plurality of keys arranged to operate the digital MFP.

Figure 2:
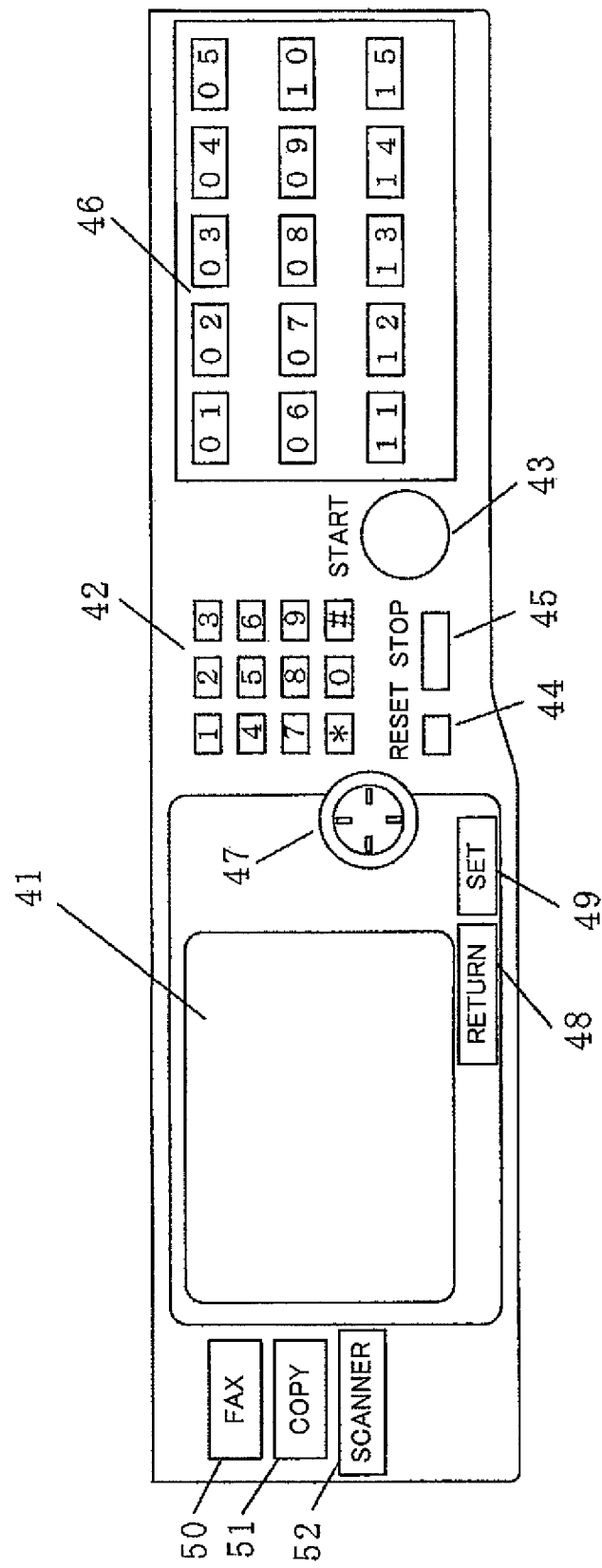
FIG. 2 illustrates a detailed structure of an operation panel.

FIG. 2 illustrates a detailed structure of the operation panel 4. A Liquid Crystal Display (LCD) unit 41 of the display unit includes a touch-screen switch, and by pressing an item displayed on the LCD unit 41, a corresponding item can be selected or a corresponding function can be executed.

A numeric keypad 42, a start key 43, a reset key 44, a stop key 45, a plurality of single-touch dial keys 46, an arrow key 47, a return key 48, and a set key 49 are preferably provided as operation keys. Moreover, a FAX key 50, a copy key 51, and a scanner key 52 are also preferably provided as function switching keys. Alternatively, these operation keys or the function switching keys may be substituted partially or entirely with the LCD unit 41.

A scanning unit 5 preferably includes a table arranged to scan original documents, such as an Automatic Document Feeder (ADF) and/or a flatbed scanner (FBS), for example, scans the original document by a scanner using a Charge Coupled Device (CCD) or the like, and outputs dot image data.

As illustrated in the drawing, the scanning unit 5 preferably includes a CCD 21, an image signal processing circuit 22, a memory controller 23, a page memory 24, and a codec 25. The image signal processing circuit 22 binarizes an image signal transmitted from the CCD 21. The memory controller 23 stores the binarized image signal corresponding to one page in the page memory 24, and then encodes the image data corresponding to one page by the codec 25 using, for example, Modified Huffman (MF), Modified Read (MR), or Modified MR (MMR) before outputting.

An image memory 6 includes a Dynamic Random Access Memory (DRAM) or the like, and stores image data to be transmitted or image data received through a facsimile function, or image data scanned through a scanning function. A recording unit 7 preferably includes a printer to print the image data received via facsimile, image data for copying, or image data transmitted from an external personal computer or the like.

As illustrated in the drawing, the recording unit 7 preferably includes a memory controller 26, a page memory 27, a codec 28, a printer image processing circuit 29, the printer 30, and a black-pixel-number counter 31. When printing, the codec 28 decodes the coded image data transmitted from the image memory 6, and the memory controller 26 stores the decoded image data corresponding to one page in the page memory 27. The memory controller 26 reads out the image data corresponding to one page from the page memory 27 to supply to the printer image processing circuit 29, and the printer image processing circuit 29 inputs an achromatic image control signal to the printer 30.

The black-pixel-number counter 31 is provided to recognize an amount of toner used in the printer, and is arranged to count black pixels in the achromatic image control signal output from the printer image processing circuit 29. When duplex-printing (double-surface printing), such as duplex-copying, the number of black pixels is counted for each surface. The black-pixel-number counter 31 is connected with the bus 11, and thus the CPU 1 can directly access a count value. The black-pixel-number counter 31 can be cleared through a control signal transmitted from the CPU 1, and the CPU 1 clears the black-pixel-number counter 31 and sets the count value to zero before starting a printing operation.

A modem 8 is preferably connected with the bus 11, and functions as a facsimile modem capable of facsimile communication. The modem 8 is preferably connected with a Network Control Unit (NCU) 9 that is similarly connected with the bus 11. The NCU 9 is hardware arranged to block or break an analog line, and connects the modem 8 with a Public Switched Telephone Network (PSTN) as necessary.

A Local Area Network (LAN) interface 10 is connected with a LAN to receive signals from a personal computer, etc., connected with the LAN. The LAN interface 10 also executes transmission of a signal to the LAN, and executes interface processes such as signal conversion or protocol conversion.

The digital MFP includes the above-described configuration, and at the time of facsimile transmission, image data of an original document is scanned by the scanning unit 5, and the image data compressed by the codec 25 is accumulated in the image memory 6. The compressed image data is read out from the image memory 6, modulated by the modem 8, and transmitted from the NCU 9 to a communication destination via the PSTN. At the time of facsimile reception, after received image data is demodulated by the modem 8 and accumulated in the image memory 6, the data is decoded by the codec 28, and then printed by the printer 30.

With reference to the flowchart of FIG. 3, a process of calculating an average printing rate and the number of remaining printable sheets executed at the time of printing will now be described.

Figure 3:
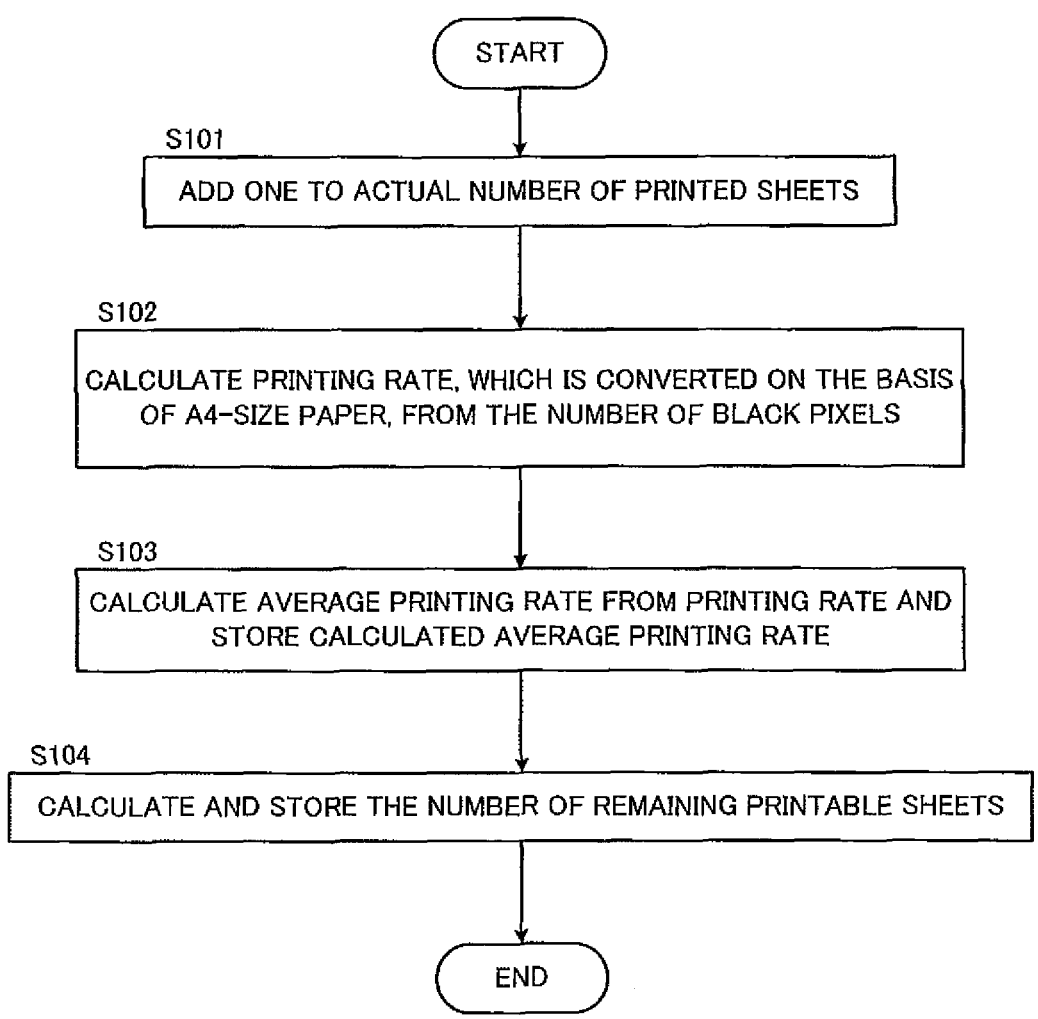
FIG. 3 is a flowchart of a process of calculating an average printing rate and the number of remaining printable sheets executed at the time of printing.

Each time one page is printed, the CPU 1 starts a program that calculates the printing rate and the number of remaining printable sheets represented in the flowchart of FIG. 3, and adds "one" to the actual number of printed sheets that is defined as a result of usage within one counting period and stored in the RAM 3 (step S101). Next, the CPU 1 acquires the number of black pixels of one page from the black-pixel-number counter 31, and after calculating a printing rate "r", which is converted on the basis of, for example, A4-size paper, from the acquired number of black pixels (step S102), the CPU 1 calculates an average printing rate "r0" using the printing rate "r" and stores the calculated average printing rate "r0" (step S103).

In other words, the CPU 1 calculates the printing rate "r" from proportion of the acquired number of black pixels to the total number of pixels of A4-size paper, and acquires the average printing rate "r0" by using the following equation:

$$\text{average printing rate ``r0''} = [\text{last average printing rate} \times (\text{actual number of printed sheets}-1) + r]/\text{actual number of printed sheets}.$$

The average printing rate "r0" is an average value of printing rates, which are converted on the basis of A4-size paper, obtained from the start of one counting period to the present. The last average printing rate is an average rate of printing rates, which are converted on the basis of A4-size paper, obtained from the start of one counting period to the last printing time. The actual number of printed sheets is the total number of printed sheets that is a result of usage in one counting period.

Next, the CPU 1 calculates the number of remaining printable sheets, which is converted into A4-size paper with the contract printing rate (20%), stores the calculated number of remaining printable sheets in the RAM 3 (step S104), and then ends the program. In other words, the CPU 1 calculates the number of remaining printable sheets by using the following equation:

$$\text{number of remaining printable sheets} = (\text{contract printing rate} \times \text{contract number of printed sheets} - \text{actual number of printed sheets} \times \text{average printing rate})/\text{contract printing rate}.$$

Then the CPU 1 stores the calculated number of remaining printable sheets in the RAM 3. The number of remaining printable sheets is the number of sheets that can be printed with the contract printing rate within a remaining counting period, and that is converted into A4-size paper.

In the above example, the average printing rate is calculated each time one page is printed, however, the printing rate "r" for each page may be stored in the RAM 3, and the number of remaining printable sheets may be acquired by using the total "$\Sigma r$" of all of the printing rates "r" obtained in one counting period as follows:

$$\text{number of remaining printable sheets} = (\text{contract printing rate} \times \text{contract number of printed sheets} - \Sigma r)/\text{contract printing rate}.$$

Figure 4:
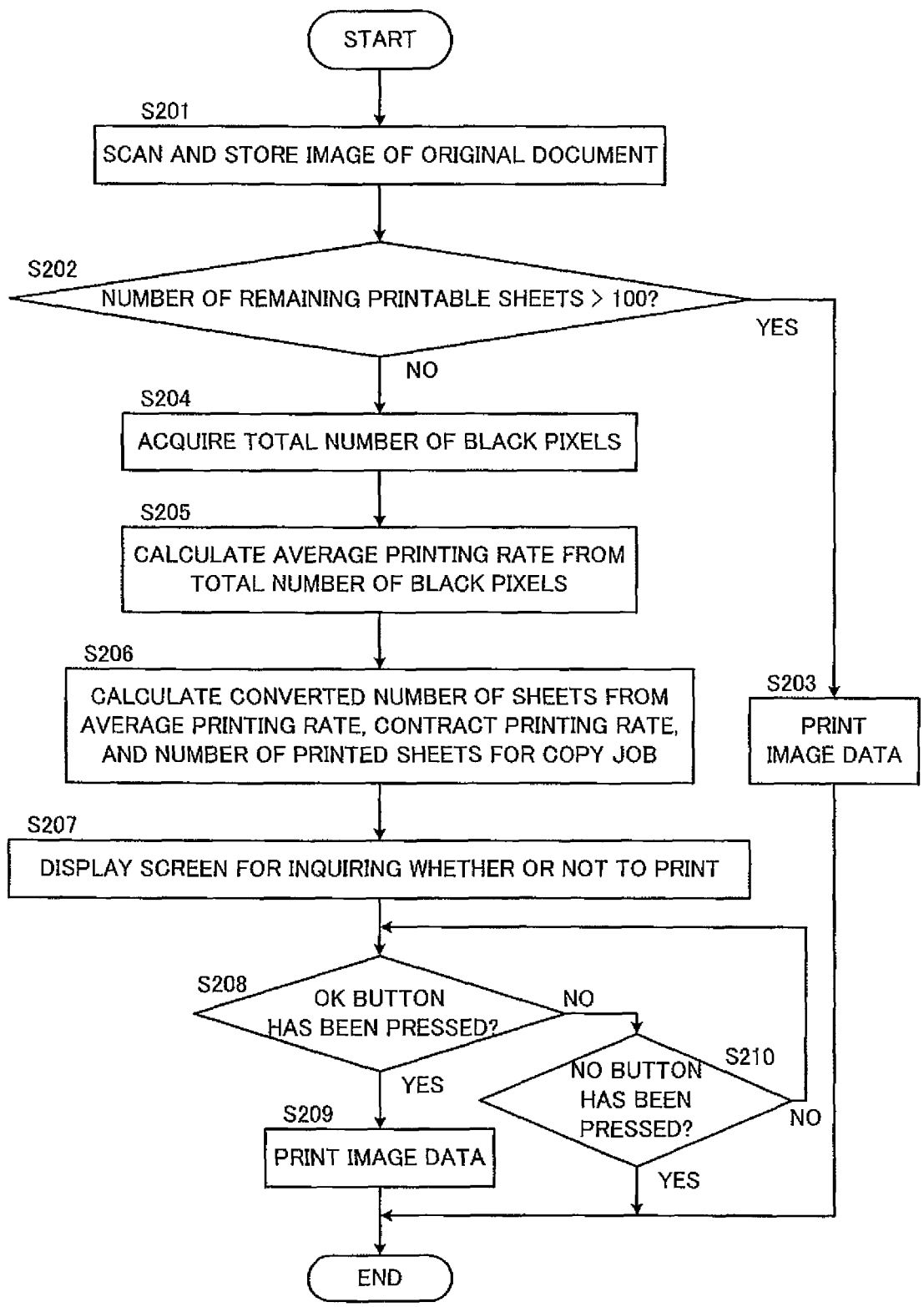
FIG. 4 is a flowchart of an operation performed by a Central Processing Unit (CPU) at the time of copying.

An operation performed by the CPU 1 at the time of copying will now be described with reference to the flowchart of FIG. 4.

A user preferably presses the copy key 51 of the operation panel 4, places an original document on the original document placing unit of the scanning unit 5, and then specifies the number of copies to be printed with respect to each page or the like. Then, when the start key 43 is pressed, the CPU 1 starts a copying program illustrated in the flowchart of FIG. 4. Through the copying program, the CPU 1 scans all of the original documents placed on the original document placing unit through the scanning unit 5, and stores image data in the image memory 6 (step S201).

Then, the CPU 1 determines whether or not the number of remaining printable sheets stored in RAM 3 is more than 100 (step S202). If the number of remaining printable sheets is more than 100, the CPU 1 prints, through the printer 30 of the recording unit 7, the image data stored in the image memory 6 (step S203), and then ends the program.

When the CPU 1 determines in step S202 that the number of remaining printable sheets is not more than 100, the CPU 1 acquires the total number of black pixels of the image data scanned by the scanning unit 5 in one copy job (step S204). In other words, the CPU 1 decodes the coded image data from the image memory 6 through the codec 28, and the memory controller 26 stores the decoded image data corresponding to one page in the page memory 27. Then, the memory controller 26 reads out the image data corresponding to one page from the page memory 27 and supplies the read-out image data to the printer image processing circuit 29. The printer image processing circuit 29 supplies the image data to the black-pixel-number counter 31. The above operation is executed for each page of the image data stored in the image memory 6, and thus, the total number of black pixels in one copy job is acquired.

Next, the CPU 1 calculates an average printing rate "q", which is converted on the basis of A4-size paper, from proportion of a value obtained by dividing the acquired total number of black pixels by the total number of original document pages of one copy job to the total number of pixels of A4-size paper (step S205). Then, the CPU 1 calculates the converted number of sheets by using the following equation:

converted number of sheets=total number of original document pages×number of copies to be printed× average printing rate "q"/contract printing rate (step S206).

Then the CPU 1 displays on the LCD unit 41 a screen for the converted number of sheets and for inquiring whether or not to print (step S207).

FIG. 5 illustrates an example of the inquiry screen displayed when the total number of original document pages is 20, the number of copies to be printed is 1, and the average printing rate is 40%. As illustrated in the drawing, since the inquiry screen displays the number of remaining printable sheets "50" and the converted number of sheets "40" at the time of printing execution, which is converted with the contract printing rate of 20%, the user can compare the two values and determine whether or not to execute printing.

After displaying the inquiry screen on the LCD display unit 41, the CPU 1 determines whether or not an "OK" button has been pressed (step S208). When the CPU 1 determines that the "OK" button has been pressed, the CPU 1 prints the image data through the printer 30 (step S209). When the CPU 1 determines in step S208 that the "OK" button has not been pressed, the CPU 1 determines whether or not a "NO" button has been pressed (step S210). When the CPU 1 determines that the "NO" button has been pressed, the CPU 1 stops the printing and ends the program. When the CPU 1 determines in step S210 that the "NO" button has not been pressed, the CPU 1 returns to step S208 to determine whether or not the "OK" button has been pressed.

As described above, in the case where the number of remaining printable sheets is not more than the predetermined number of sheets, when executing a copying operation, a copying process is suspended once at the time of completion of the original document scanning, and the screen for inquiring whether or not to print is displayed. Since the inquiry screen displays the converted number of sheets, which is converted with the contract printing rate, and the number of remaining printable sheets, the user can confirm whether or not the contract number of printed sheets contracted in the maintenance agreement is exceeded when the original documents are actually copied. Therefore, the number of sheets to be printed can be easily prevented from exceeding the contract number of the maintenance agreement.

As described above, in the case where the number of remaining printable sheets is not more than the predetermined number of sheets, even when the copying process is suspended and the screen used in inquiring whether or not to print is displayed, if the copies are necessary, the total number of printed sheets, which is converted with the contract printing rate, may exceed the contract number of printed sheets. Accordingly, a carry-over function for the total number of printed sheets, which is converted with the contract printing rate, can be provided.

That is, in addition to the contract printing rate and the contract number of printed sheets, a contract period of time, for example, 48 months, can be registered as the contract detail, and an excess amount or an unused amount within one counting period, such as one month or three months, can be carried over to the subsequent counting period(s). The total number of printed sheets, which is converted with the contract printing rate, can be acquired by using the following formula:

actual number of printed sheet×average printing rate/ contract printing rate.

For example, in the case of the maintenance agreement in which the contract number of printed sheets is 2400 with the contract printing rate of 20%, it is given that a result of usage for January is 3000 sheets, which is the total number of printed sheets converted with the printing rate of 20%. In such a case, the number of remaining printable sheets is calculated by replacing the contract detail for February with the contract number of printed sheets of 1800 (2400−600) with the contract printing rate of 20%, and then, the above-described notification of permission of printing is performed.

When the result of usage for January is 2000 sheets, which is the total number of printed sheets converted with the printing rate of 20%, the contract detail for February is replaced with the contract number of printed sheets of 2800 (2400+400) with the contract printing rate of 20%. Then, the replaced contract number of printed sheets is used to calculate the number of remaining printable sheets, and the above-described notification of permission of printing can be performed.

Thus, even if the total number of printed sheets, which is converted with the contract printing rate, in one counting period, exceeds or falls below the contract number of printed sheets, the total number of printed sheets, which is converted with the contract printing rate, in the entire agreement period can be adjusted to be nearly equal to the contract number of printed sheets. The function of carrying over the excess amount and the function of carrying over the unused amount may be turned on/off by machine setting, and the two functions may be collectively or separately changed.

In the above-described preferred embodiments, when the number of remaining printable sheets is not more than the predetermined number of sheets, the screen used in inquiring whether or not to print is displayed. However, the inquiry screen can also be displayed when the number of remaining printable sheets is likely to go negative by the execution of copying. In other words, when the total number of printed sheets, which is converted with the contract printing rate, in one counting period, is likely to exceed the contract number of printed sheets, which is within the range of basic charge, if the copying which will be executed at the moment is executed, the inquiry screen is displayed.

Further, in the above-described preferred embodiment, the printing rate is calculated by using the black-pixel-number counter. However, without using the black-pixel-number counter, the printing rate may be acquired after the original scanning based on the image data for printing transmitted from the printer image processing circuit 29 or on the image data stored in the image memory 6. In such a case, the printing rate acquired from the image data may be reduced from that of the same magnification in accordance with a reduction rate according to print setting, for example, when performing a reducing operation. In the case of "N in 1" (which means N pages in one sheet), the number of printed sheets, for example, may be calculated to be reduced from that of the case of "1 in 1" (which means 1 page in 1 sheet).

In the above-described preferred embodiment, the average printing rate and the number of remaining printable sheets are calculated each time one page is printed. However, the average printing rate and the number of remaining printable sheets may be calculated and stored each time a function of the digital MFP, for example, a copying function, a facsimile receiving function, a printing function or the like, is executed.

In the above-described preferred embodiments, the inquiry screen preferably is automatically displayed when the number of remaining printable sheets is not more than the predetermined number of sheets. However, the inquiry screen may be displayed all the time regardless of the number of remaining printable sheets.

Alternatively, by providing a confirmation switch on the operation panel 4, the inquiry screen may be displayed when the confirmation switch is pressed at the time of copying. A confirmation function through the confirmation switch may be turned on/off by machine setting.

Further, the above-described preferred embodiments describe monochrome printing as just one example. However, a printing rate and the number of printed sheets of the printing in color and a printing rate and the number of printed sheets of the printing in monochrome may be individually calculated, and in the case of color printing, a printing rate may be calculated for each color material, and an average of printing rates of each color material may be calculated. When Cyan (C), Magenta (M), and Yellow (Y) are used as the color materials, for example, in the case of cyan, the number of cyan pixels of one page is acquired from the image data, etc., and a cyan printing rate can be calculated from proportion of the acquired number of cyan pixels to the total number of pixels of A4-size paper. Then, the number of remaining printable sheets can be calculated from the average value of the acquired printing rates of each color material, a contract color printing rate, and the contract number of color printed sheets, and the converted number of sheets can be calculated by using the average value of the printing rates of each color material at the time of copying.

When one image forming apparatus is shared by a plurality of users, a maintenance agreement may be made with respect to each user, and the number of remaining printable sheets may be calculated and the inquiry screen may be displayed with respect to each user.

The above-described preferred embodiments describe the examples in which the image forming apparatus of the present invention is applied to a digital MFP, however, the present invention may be applied to a normal copier without a facsimile function.

While the present invention has been described with respect to preferred embodiments thereof, it will be apparent to those skilled in the art that the disclosed invention may be modified in numerous ways and may assume many preferred embodiments other than those specifically set out and described above. Accordingly, the appended claims are intended to cover all modifications of the present invention that fall within the true spirit and scope of the present invention.

What is claimed is:

1. An image forming apparatus comprising:
an image scanning unit arranged to scan an original document and to generate image data;
an image forming unit arranged to form an image on a recording medium based on the image data; and
a control unit arranged to control each of the image scanning unit and the image forming unit; wherein
after the original document is scanned by the image scanning unit when executing a copying operation, the control unit is arranged to calculate a converted number of sheets using a contract printing rate, from a printing rate of acquired image data, the contract printing rate of a maintenance agreement, and the number of sheets to be printed in the copying operation, and to notify a user of the calculated converted number of sheets; and
when the user instructs to print, the image forming unit is arranged to form the image based on the image data.

2. The image forming apparatus according to claim 1, wherein each time the image forming unit forms the image, the control unit calculates a number of remaining printable sheets from a contract number of printed sheets and the contract printing rate of the maintenance agreement, an average printing rate up to that time, and a number of sheets that have been printed up to that time; and
when the number of remaining printable sheets is not more than a predetermined number at the time of executing a copying operation, the control unit notifies the user of the converted number of sheets.

3. The image forming apparatus according to claim 2, wherein the control unit displays the number of remaining printable sheets along with the converted number of sheets.

4. The image forming apparatus according to claim 3, wherein the predetermined number of sheets is set to be 100.

5. The image forming apparatus according to claim 3, further comprising a carrying-over function for a total number of printed sheets, which is converted using the contract printing rate.

6. A method of image forming comprising the steps of:
scanning an original document to acquire image data when executing a copying operation;
storing the acquired image data in a memory,
calculating, by a processor, a converted number of sheets, which is converted using a contract printing rate, from a printing rate of the image data, a contract printing rate of a maintenance agreement, and a number of sheets to be printed in the copying operation;
notifying a user, by a display, of the calculated converted number of sheets; and
forming an image based on the image data when instructed by the user to print.

* * * * *